US006865545B1

(12) United States Patent
Epstein et al.

(10) Patent No.: US 6,865,545 B1
(45) Date of Patent: Mar. 8, 2005

(54) METHOD FOR PROVIDING CONSUMERS WITH OFFERS

(75) Inventors: Seth M. Epstein, West Hartford, CT (US); William Bailey, Avon, CT (US); William Zeigler, Chester, CT (US); Corey Snook, Meredith, NH (US); Steve Simoneau, South Killingly, CT (US); Rick Dinnis, Stratford, CT (US); Mark S. Smith, West Hartford, CT (US); Jennifer J. Smith, West Hartford, CT (US); George V. Cinquegrana, Southbury, CT (US)

(73) Assignee: TRS Holding, Inc., Hartford, CT (US)

( * ) Notice: Subject to any disclaimer, the term of this patent is extended or adjusted under 35 U.S.C. 154(b) by 870 days.

(21) Appl. No.: 09/615,175

(22) Filed: Jul. 13, 2000

Related U.S. Application Data (63) Continuation of application No. 09/375,311, filed on Aug. 16, 1999, which is a continuation-in-part of application No. 08/614,514, filed on Mar. 13, 1996, now Pat. No. 5,995,942.

(51) Int. Cl.[7] .............................................. G06F 17/60
(52) U.S. Cl. .............................. 705/14; 705/16; 705/26
(58) Field of Search ............................... 705/14, 16, 26

(56) References Cited

U.S. PATENT DOCUMENTS 4,723,212 A  *  2/1988  Mindrum et al. ............. 705/14
4,882,675 A  * 11/1989  Nichtberger et al. ......... 705/14
5,173,851 A  * 12/1992  Off et al. ..................... 705/14
5,353,218 A  * 10/1994  De Lapa et al. .............. 705/14
5,845,259 A  * 12/1998  West et al. ................... 705/14
5,926,809 A  *  7/1999  Szalwinski .................... 707/3
5,974,399 A  * 10/1999  Giuliani et al. .............. 705/14
6,307,958 B1 * 10/2001  Deaton et al. ............. 382/139
2001/0013011 A1 *  8/2001  Day et al. ..................... 705/14
2002/0026368 A1 *  2/2002  Carter, III .................... 705/20

FOREIGN PATENT DOCUMENTS

WO          WO 9110216 A1 *   7/1991   ............. G07F/7/06

OTHER PUBLICATIONS

Mark Albright; Goal's to give coupon, make sale, keep record Series: CENTERPIECE:[CITY Edition] St. Petersburg Times. St. Petersburg, Fla.: Jun. 7, 1993.*

* cited by examiner

*Primary Examiner*—Jagdish N Patel
(74) *Attorney, Agent, or Firm*—Bachman & LaPointe, P.C.

(57) ABSTRACT

In accordance with the present invention, a method for providing a consumer with a plurality offers to be used to purchase goods is provided. The method comprises the steps of: providing a database containing a plurality of available offers with the offers being arranged in groups and the offers in each of the groups being arranged in ranked tiers; connecting a consumer activated dispenser to the database; selecting a plurality of offers from the database for presentation to the consumer each time the consumer activates the dispenser; and the selecting step comprising examining each group in the database for available offers starting with a highest priority tier in said group and proceeding to a lowest priority tier.

21 Claims, 7 Drawing Sheets

| Dbl Action<br>40 Tablets<br>Aisle Save<br>1 $0.40 | Advantage<br>soft angle 40<br>Aisle Save<br>1 $0.50 | Comfort Super<br>20 count<br>Aisle Save<br>1 $0.50 | Pantiliners<br>Amt 18-22 count<br>Aisle Save<br>1 $0.40 | Toothpaste<br>3.5 oz.<br>Aisle Save<br>1 $0.60 | Mouthwash<br>16 oz.<br>Aisle Save<br>1 $0.50 |
|---|---|---|---|---|---|
| Hemmaroid ointment<br>2 oz.<br>Aisle Save<br>2 $0.40 | Muscle RubCream<br>3 oz.<br>Aisle Save<br>2 $0.25 | Any Type<br>Any Size<br>Aisle Save<br>3 $0.50 | Decongestant<br>1 oz.<br>Aisle Save<br>3 $0.50 | Orig. Choc Flavor<br>40 Tablets<br>Aisle Save<br>3 $0.60 | Coated Tablets<br>50 Count<br>Aisle Save<br>3 $0.50 |
| Caplets<br>12 count<br>Aisle Save<br>3 $0.75 | Any Type<br>Any Size<br>Aisle Save<br>3 $0.50 | Cramp Relief<br>200mg/ 24 Tabs<br>Aisle Save<br>3 $0.75 | Chewable Tablets<br>30 Count<br>Aisle Save<br>3 $0.50 | Saline<br>Sensitive / 12 oz.<br>Aisle Save<br>3 $0.60 | Elastic Lee<br>36 Count<br>Aisle Save<br>4 $1.00 |
| Ultra Detergent<br>50 oz.<br>Aisle Save<br>10 $0.50 | Hard Candy<br>14 oz.<br>Aisle Save<br>1 $0.20 | Lightbulbs 4 PK<br>40 - 100 watt<br>Aisle Save<br>13 $0.50 | Baby Wipes<br>W/Refill 168 cnt<br>Aisle Save<br>14 $0.25 | Baby Shampoo<br>50.7 oz.<br>Aisle Save<br>14 $0.50 | Lotion<br>9 oz.<br>Aisle Save<br>14 $0.50 |
| Cotton Swabs<br>200 count<br>Aisle Save<br>14 $0.50 | Lotion<br>16 oz.<br>Aisle Save<br>Cosme $0.75 | Max Strength<br>1 oz.<br>Aisle Save<br>Cosme $0.50 | Cream<br>1.59 oz<br>Aisle Save<br>Pharm $1.00 | Any 3 Pak<br>Limit 3/customer<br>Aisle Save<br>Photo $0.75 | 24 exp or more<br>limit 3/cutomer<br>Aisle Save<br>Photo $0.45 |

Total Available Savings: $16.00

METHOD FOR PROVIDING CONSUMERS WITH OFFERS

CROSS-REFERENCE TO RELATED APPLICATION(S)

This application is a continuation of U.S. patent application Ser. No. 09/375,311, filed Aug. 16, 1999, now abandoned, which is a continuation-in-part application of U.S. patent application Ser. No. 08/614,514, filed Mar. 13, 1996, to a STORE LEVEL MARKETING SYSTEM by Smith et al., now U.S. Pat. No. 5,995,942.

BACKGROUND OF THE INVENTION

The present invention relates to a method for dispensing offers to consumers.

Systems for dispensing offers to consumers are known in the art. U.S. Pat. No. 4,896,791 to Smith illustrates one such system. The Smith system displays a number of images, each image representing a product to be promoted. The system also includes a product selection area to be manipulated by a consumer to select that product. A switch is associated with each selection area to register the selection. The system receives an access code unique to the consumer, records product selections made by the consumer, compares the product selected by the consumer with a preselected quota, and issues a coupon for the product selected by the consumer if the quota for that consumer is not exceeded. One of the disadvantages to the Smith system is that it does not allow a retailer to customize the coupons available to an individual consumer.

U.S. Pat. No. 4,982,346 to Girouard et al. relates to a mall promotion network apparatus and method. The apparatus is a computer system for automating advertising and promotional campaigns. The computer system includes a magnetic stripe card reader, bar code reader, monitor, printer, keyboard, and touchscreen input device. Software executing on the computer manages the operations of the devices. The system displays advertisement and product or store locator maps, dispenses coupons, accepts products orders, and manages customer surveys. The system is very complex and does not allow a retailer to customize the coupons to be offered to each individual consumer.

U.S. Pat. No. 5,025,139 to Halliburton, Jr. illustrates a redeemable coupon disbursement control and reporting system for automated teller machines. The system includes either a bar code scanner attachment used with preprinted continuous roll or single sheet automated teller machine. In either form, first recording means are communicably attached to the disbursing or printing means and remote optical scanning means are employed at the point of coupon redemption, such scanning means being attached to either such first or a second recording means reconcilable with information recorded on such first recording means. This system also suffers from the deficiency that it does not allow the coupons to be dispensed to a consumer to be customized for the consumer.

U.S. Pat. No. 5,039,848 to Stoken relates to a machine for dispensing a plurality of coupons. The machine includes a cabinet and a display area on the cabinet indicating the different bargains capable of being acquired by redemption of the respective coupons and a specific amount of money required to obtain each respective coupon. Selection buttons mounted on the cabinet are used to select a desired one of the different bargains and the respective coupon therefor. A coin slot and collection box in the cabinet are used to receive various amounts of money. The coupons are stored in the cabinet and are aligned with a coupon dispenser which is capable of dispensing each coupon to the exterior of the cabinet through a slot. Control circuitry is provided to insure that money is deposited into the collection box before the coupon is dispensed. This system also suffers from the deficiency that it does not allow the retailer to customize the coupons to be offered to an individual consumer.

U.S. Pat. No. 5,176,224 to Spector relates to a computer controlled system including a printer dispenser for merchandise coupons. The system includes a coupon printer-dispenser installed at a supermarket which makes it possible for a shopper to receive a merchandising coupon entitling him/her to a specified discount on the product identified on the coupon. The printer, which is computer controlled, is linked to at least one manufacturer whose product is available in the supermarket. The manufacturer instructs the printer as to the data to be printed. The printer, when actuated by the shopper, prints on a universal coupon blank the identity of the manufacturer's product and the discount to which the holder is entitled as then determined by the manufacturer, the printed coupon then being dispensed. When the shopper purchases this product and redeems the coupon at a checkout counter at the supermarket, he is accorded the specified discount. Checkout counters at the supermarkets having coupon dispenser installations are linked to each manufacturer, thereby completing the loop, the manufacturer being provided with a readout of discount coupon transactions so that on the basis of this readout, he can alter the discount amount to be printed on the blank coupon. This system also suffers from the deficiency that a retailer can not customize the coupons offered to the consumer.

None of these prior art systems allow retailers and product manufacturers the ability to effectively reach consumers in-store.

SUMMARY OF THE INVENTION

Accordingly, it is an object of the present invention to provide an improved method for providing consumers with shopping offers and purchase incentives.

It is a further object of the present invention to provide a method as above which issues a printed document or offer sheet containing a collection of promotional incentives which consumers use to redeem promotional offers at checkout.

It is yet a further object of the present invention to provide a method as above which collects profiles on individual purchasers and provides retailers and manufacturers with the ability to target consumers based on individual purchase behavior.

The foregoing objects are attained by the method for dispensing offers to consumers of the present invention.

In accordance with the present invention, a method for providing a consumer with a plurality of offers to be used to purchase goods is provided. The method comprises the steps of: providing a database containing a plurality of available offers with the offers being arranged in groups and the offers in each of the groups being arranged in ranked tiers; connecting a consumer activated dispenser to the database; selecting a plurality of offers from the database for presentation to the consumer each time the consumer activates the dispenser; and the selecting step comprising examining each group in the database for available offers starting with a highest priority tier in said group and proceeding to a lowest priority tier.

Other details, objects, and advantages of the method of the present invention are set forth in the following detailed

DETAILED DESCRIPTION OF THE PREFERRED EMBODIMENT(S)

Figure 1:
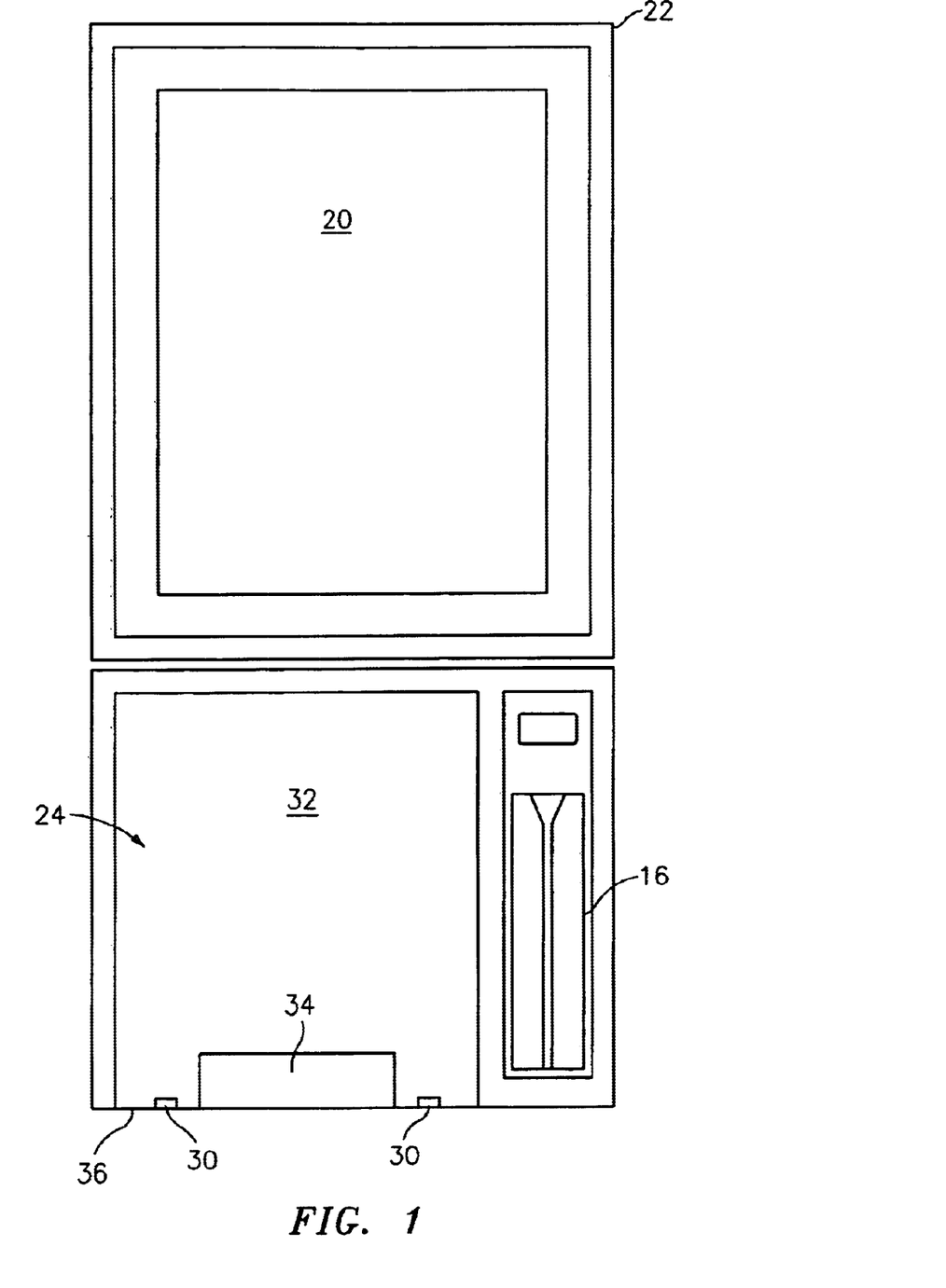
FIG. 1 is a front view of an in-store dispenser used in a store-level marketing system.
Figure 2:
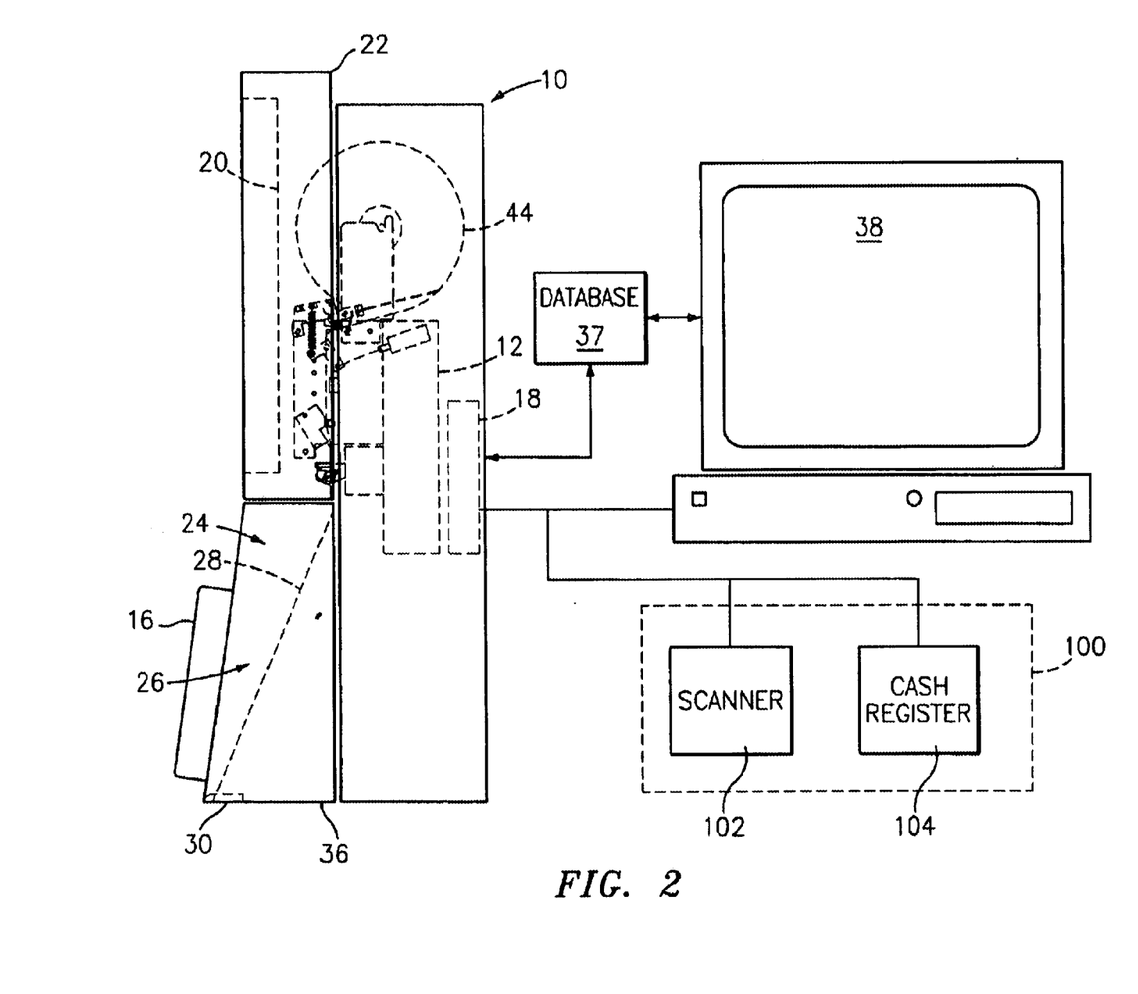
FIG. 2 is a side view of the in-store dispenser shown in FIG. 1.

Referring now to the drawings, a store-level marketing system, in accordance with one aspect of the present invention, as shown in FIGS. 1 and 2, includes a dispenser 10 to be placed in a retail store such as a supermarket, drug store, convenience store, department store or any other retail or commercial environment. The dispenser 10 may be placed in any location in the store convenient for access by consumers. The dispenser 10 may be fabricated from any suitable material such as metal, wood or plastic.

Figure 3:
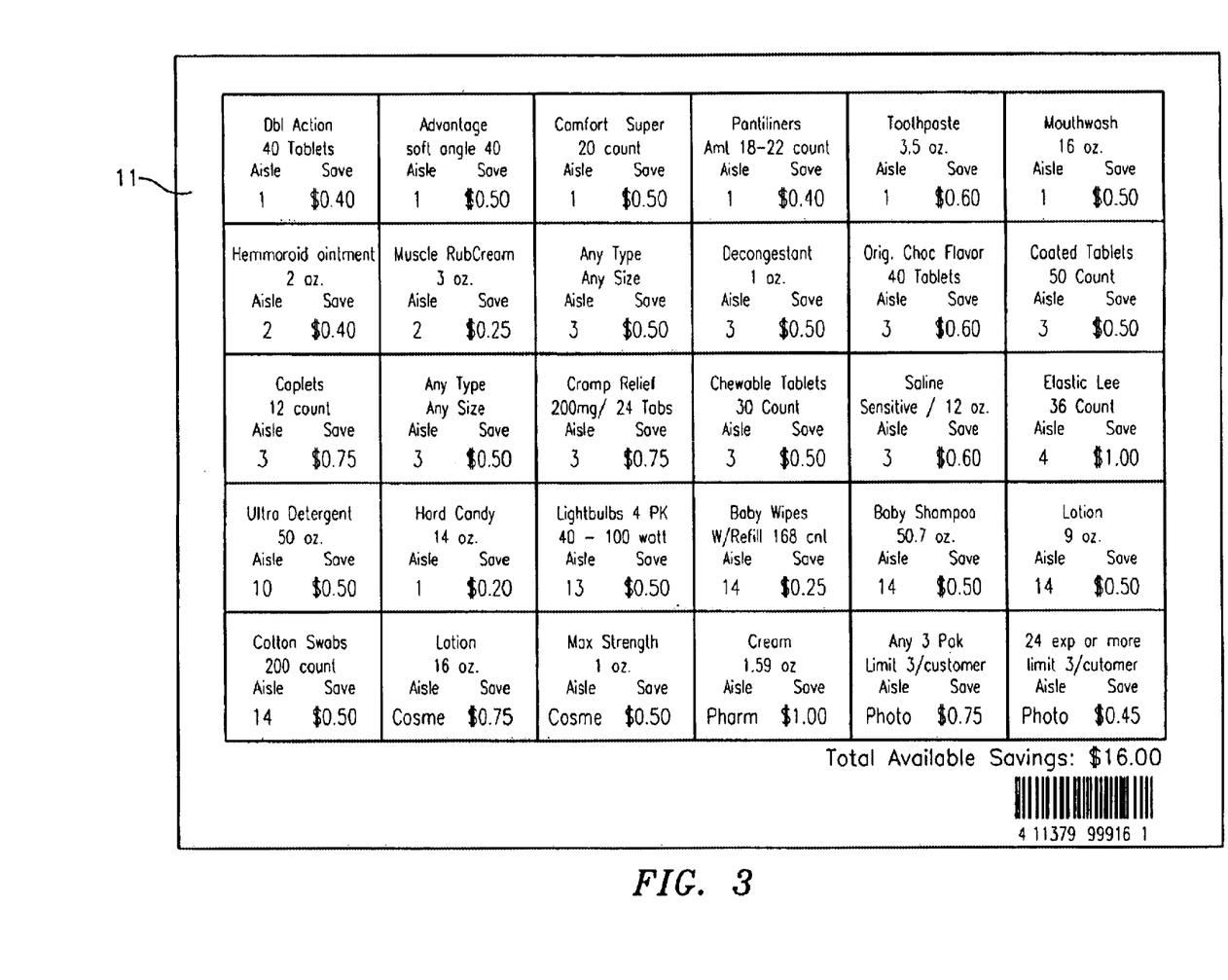
FIG. 3 illustrates an offer/savings sheet dispensed by the method of the present invention.

The dispenser 10 houses a printer 12 for printing a paper document 11 known as an offer sheet. Such an offer sheet is shown in FIG. 3. The sheet may contain one or more offers, savings, or discounts as well as product information. The dispenser 10 further houses a supply of paper 14 for the printer 12 and an activation device 16 such as an optical card reader, a magnetic stripe reader, a push button and/or a keyboard. Preferably, the printer 12 is mounted in a vertical position.

The activation device 16 is used to trigger the system and the method of the present invention. Through the activation device, input information about the consumer, such as a name, an address, an identification number, an account number and/or an access code, is entered into the system. The consumer information or consumer identifier may be carried on a card to be read by an optical card reader or, alternatively, on a magnetic stripe on the back of a card, which stripe is read by a magnetic stripe reader when the card is run through the reader. The activation device 16 could also be a keyboard, key pad or a push button device which enables a user, such as a new user, to gain access to the system. If desired, the system may employ more than one of the above activation devices.

In one embodiment of the present invention, the activation device 16 communicates with a network interface or a computer 18 which is housed within the dispenser 10 or is located in another area of the retail establishment. The network interface or computer 18 may comprise any suitable computer known in the art. The network interface or computer 18 may be used to store profile information about consumers and their shopping habits, to store information about offers, in the form of discounts, cents off, dollars off, percent off, or buying combinations, such as buy three get one free, and the like, and to store product information, all of which can be issued to consumers. The computer 18 may be programmed to carry out the method of the present invention.

When the in-store dispenser 10 is activated, the network interface or computer 18, through its programming, identifies the user and preferably selects a number of promotional offers to be issued to the consumer from the stored information about such offers. As will be discussed hereinafter, the selection of offers to be presented to each consumer may be based in part on the profile of the consumer in storage or on other criteria.

The network interface or computer 18 is connected to the printer 12. It communicates with the printer 12 and instructs it as to what offers and information are to be printed on the offer sheet 11.

If desired, the network interface or computer 18 may be programmed to instruct the printer 12 to print certain offers to a new consumer upon which the network interface or computer 18 has no consumer buying profile. By using the activation device 16, e.g. by pushing a button or a certain key on a keyboard or key pad or by using a card that can be validated by the activation device, a consumer may gain access to the system and initiate the computer programming to obtain an offer sheet 11 bearing purchase incentives and/or product and/or store information.

The network interface or computer 18 can also be programmed to instruct the printer 12 to print certain information on the paper document 11 bearing the offers. This information can include a unique code, such as a bar code, which identifies the consumer and/or the document. Still further, the network interface or the computer 18 may be programmed to instruct the printer 12 to print promotional messages advising the consumer of certain product information, other products for sale in the store, and/or non-product information.

The dispenser 10 may include a light box area 20 in which a message to consumers or the name of an advertiser can be displayed, which message may be back lit by a light bulb not shown. The light box area 20 may be housed within a panel 22 which is hingedly connected to a side wall of the dispenser 10. By providing such a hinge connection, the panel 22 may be pivoted so that access to the interior of the dispenser 10 can be easily gained.

The dispenser 10 further includes a gravity feed chute 24 which aligns with the outlet of the printer 12. The gravity feed chute 24 has sidewalls 26, an angled back wall 28, holding fingers 30, and a cover plate 32. The cover plate 32 is provided with a slot 34 adjacent its lower end to enable a consumer to take the printed document containing the offers. The cover plate 32 is preferably formed from a clear material, such as a LEXAN or some other clear plastic material, and allows a consumer to see the printed document immediately as printing begins. If desired, the gravity feed chute 24 may be housed in a panel 36 which is also hingedly connected to a sidewall of the dispenser 10. In this way, further access to the interior of the cabinet can be gained. As shown in FIG. 1, the panel 36 may also house the activation device 16.

If desired, the profile information about consumers and the information about available offers can be stored in a database 37. The database 37 may be accessed with by the computer 18. Alternatively, the database 37 may be associated with a remote computer 38 located externally of the dispenser 10. If desired, the remote computer 38 could be programmed to make the decisions about the offers to be issued to a consumer and to transmit the selected offers to the printer 12 in the dispenser 10 via the network interface or computer 18 and appropriate communication links. In such a system, the remote computer 38 would receive the information inputted by the consumer via the network interface or computer 18 and the communications link between the two.

In yet another alternative embodiment, the network interface or computer 18 may be omitted altogether. In this embodiment, information inputted via the activation device 16 is transmitted directly to the remotely located computer 38 via a communications link and instructions are transmitted from the computer 38 to the printer 12 via a suitable communications link.

The printer 12 used in the store level marketing system of the present invention is preferably a thermal printer. Typically in such printers, the thermal paper to be used in the printer is supplied wound on a 2" diameter roll or core. The result is a natural bend or curl in the paper, which curl is aesthetically unpleasing and troublesome when the paper is fed into the printer. The printer 12 employed in the store level marketing system of the present invention is provided with a means for substantially eliminating this curl in the paper. The curl eliminating means preferably comprises the means set forth in allowed parent application Ser. No. 08/614,514, which is hereby incorporated by reference herein.

The printer 12 is also provided with a means (not shown) for cutting the paper after the printer finishes printing an offer sheet 11 such as that shown in FIG. 3. After the paper is cut, the offer sheet 11 falls into the gravity feed chute 24 which is aligned with the outlet of the printer 12. The cutting means may comprise any suitable cutting means known in the art.

After the consumer has received his/her savings sheet and completed his/her shopping in the store, the consumer takes the savings sheet and his/her purchases to a checkout station 100. The checkout station or point of sale (POS) terminal 100 includes a scanner 102 for scanning the code on the offer sheet 11 and/or a card issued to the consumer and for scanning the codes of the products that have been purchased by the consumer. It also includes a cash register 104 which is appropriately connected to the scanner and to the computer 18 and/or the computer 38. The scanner may comprise any suitable scanner known in the art. Preferably, the scanner communicates with the computer 18 and/or the computer 38 through suitable communication lines.

Once the scanner 102 scans the savings sheet and when the transaction is closed, a signal is sent via the communication lines to the computer 18 or to the computer 38 to identify the document and to cancel the document so that it can not be used a second time. As the products purchased by the consumer are scanned, information about the products is also sent to the network interface or computer 18 or the computer 38 via the communication lines. Preferably this consumer purchase history is stored in the database 37. The computer 18 or the remote computer 38 then compares the products purchased by the consumer with the offers on the identified document. If the computer 18 or the remote computer 38 through its programming finds that the consumer is qualified for a particular offer, it sends a signal to the cash register 104 which allows the consumer to receive an instantaneous discount or the like.

The product information received by the computer 18 or the remote computer 38 is saved in a file which contains other information about the consumer. The file may be stored in either the computer 18 or the computer 38 and/or the database 37. By doing this, a consumer purchaser profile can be maintained. If desired, the product information could also be stored in other files. For example, the information could be stored in files which identify the purchase volume of a particular product. The information could also be stored in files which identify the number of consumers that have taken advantage of certain offers or promotional incentives.

The method for selecting offers to be presented to a consumer upon his/her activation of the dispenser 10 will now be described. The method is carried out via programming whose structure will be described hereinafter. The program implementing the method of the present invention may be in any suitable programming language.

As used herein, the term "offer" is defined as a unique individual communication to a shopper which may incentify a shopper to buy a product, reward a shopper for loyal patronage, or any other type of shopper promotional incentive/reward. The offer is selected and delivered to the consumer via the aforementioned system. The offer which is presented to the consumer can consist of one or more of the following: product description; non-product description; product logo; and/or discount amount.

As used herein, the term "redemption" is defined as the shopper exercise of an offer issued by the dispenser 10.

As used herein, the term "group" is defined as a unique user defined code given to one or more system offers upon creation of that offer. This code will determine the offer area on the hard copy printout or offer sheet 11 received by the consumer via the dispenser 10. This unique group code is criteria utilized in the offer selection process defined hereinafter.

As used herein, the term "tier" is defined as a unique user defined code given to one or more offers in a group which allows the system to prioritize the offer. This code is used in the selection process to determine offer availability for an individual consumer's hard copy printout.

As used herein, the term "offer sheet" is defined as a unique collection of offers and other information, which is printed for a consumer via the dispenser 10.

As used herein, the term "user" refers to the entity supervising the system and/or the entity that owns the store or stores in which the system is placed.

Each time a consumer activates the dispenser 10, the programming associated with the computer 18 and/or the computer 38 builds an offer sheet 11 from the collection of offers stored within the computer 18 and/or 38 or in the database 37 qualifying for selection. Offers available for the selection process are examined in each group (location on the offer sheet) starting with the highest priority tier. Qualifying offers continue to be examined in a tier until all offers in a particular tier have been examined or until enough offers are found in a tier to satisfy a maximum offers per tier requirement. The selection process continues examining each tier in a priority descending manner until the system has selected the specific number of offers for this group. The selection process is then repeated for each unique group until the requirements of the offer sheet have been met.

Offers may contain qualifying information which is used by the programming at the time the shopper activates the dispenser 10 to determine if a specific shopper qualifies for selection for that offer. A unique offer sheet is generated for that specific shopper from the qualifying offers selected by the programming.

Each offer may have its own unique start and end, date and time. The start and end date can be set to any interval. For example, an offer is valid for selection from Monday to Wednesday. The start and end time can also be set to any interval. For example, the offer may be valid from Monday at 10:00 A.M. until Wednesday at 4:00 P.M. Each offer may have a unique and definable time parameter. An offer can also be available for selection on a specific day with specific hours for that day. Offers can be available for selection at specific hours within a specific day and/or for multiple days of the week. For example, an offer can be available only between the hours of 2 P.M. and 4 P.M. on Tuesday and the same offer can be available again between 8 P.M. and 9 P.M. Thursday, if so selected.

Counting limits may be set for offers, limiting the number of times a specific offer is issued. Similarly, limits can be set limiting the number of times an offer can be redeemed and limit the total value of the redemptions. This is done by an assumption made by the programming that at issuance an offer will be redeemed and is therefore counted as such in the total offer redemption limits. Once the disposition of the offer is known by the system, the redemption limits may be updated accordingly. For example, when a consumer checks out, or if his/her offer sheet expires, the count may be readjusted and the value for the offer may be readjusted if it has not been redeemed. In this way, the redemption limits can be kept up to date.

There are a number of methods to associate specific offers with specific shoppers. In a first method, a list of offers is maintained for every consumer stored in the system. This list is updated by command to the dispenser 10. When an offer is marked as individually targeted, its identification must appear in the record for the consumer presenting his/her card or other identification information for the offer to be issued. In addition to the offer identification, the system also maintains issue and redemption limits for the consumer, which constrain the number of times an offer will be issued, based on previous issuance and/or redemption of that offer.

In a second method, list targeted offers are used as a mechanism to drive targeting from an external system. By identifying a known directory on the external system, the programming watches and mirrors the files in that directory. When an offer is seen which is marked as list targeted, the programming first determines if there is a list which corresponds to the offer. The programming then checks to see if the consumer is contained on the list. If the consumer is, the programming checks the consumer's list of offers and, if this offer is not yet represented, the identifier for this offer is placed on the consumer offer list. The programming then applies the same test as for the individual targeted offers.

In a third method, each consumer is identified as belonging to a specific group of categories, e.g. decile. Additionally, each consumer carries a particular profile, e.g. dog owner. Offers can be created which will be issued on the condition that the consumer's profile or category meets the requirement of the offer. For example, an offer can be issued to consumers who are in the 7th decile or above and who have been identified as dog owners.

A check in determining whether to issue a particular offer is made if there is a constraint to issue the offer based on a modulo count. Each time an offer sheet is issued, a count is incremented. If there is a non-zero value in the offer's relevant field, the issue count is divided by the number. The offer is issued only if the remainder of the division is equal to the number in the offer.

The intended use of the modulo check is to perform an "instant win" function. This function provides the ability to reward a consumer as he/she scans his/her card at the dispenser 10, real-time and in-store. The instant win is triggered by issuing an offer or instant win to every "nth" card. For example, issue a free sample of a product to every 10th shopper that activates the dispenser 10. The software is provided with the ability to specifically set the parameters for the utilization of the function. The offer or instant win can be limited by the previous features like time limits, counting limits, and day and hour limits. The instant win function can also be tiered in that the system and its programming could issue one type of instant win offer to every 10th consumer who activates the system and another instant win offer to every 20th consumer. The system and its programming is structured so that the 20th person would not receive both the 10th and 20th offers.

Sweepstakes offers can also be executed utilizing the programming of the present invention. This can be done by allowing each consumer to be entered as they activate the dispenser 10. The programming would also allow for continuity type sweepstakes which could be tied to offer redemption. The sweepstakes function could be utilized to promote the system by entering a consumer when he/she activates the dispenser 10 and also activates the offer sheet upon checkout.

Using the method of the present invention, the offer details can be cross checked with the individual store's internal POS system. This process is performed upon activation of the offers, as they become available in the offer selection process. The programming in the computer 18 or 38 can communicate with the store's internal POS system to match the offer value with what the store has input as the valid offer value. The program will automatically change the value in the computer 18 or 38 to what resides on the store's internal POS system to assure that consumers receive the offer value that will be processed upon checkout. This crosscheck is performed in real-time and any adjustment necessary is made real-time.

The programming used to implement the method of the present invention has the ability to modify an offer, in store in real-time. The offer modification allows the user to activate a predefined offer or adjust an offer value from the store's internal POS system.

Adjusting an offer value allows the user to change an offer value through his POS system without communication with the system operator. The programming used to implement the method of the present invention can automatically perform offer validation and in this process the offer value is changed if the user modifies the offer value on the POS system.

In many situations, more than one dispenser 10 will be located in an individual store or within the stores of a chain. Peer to peer notification can be utilized to allow a store or stores with two or more dispensers to communicate with each other in terms of updating consumer information. At all times, each dispenser updates the other as to consumer data. This real-time communication of consumer data is unique to the method of the present invention.

Shopper notification is defined as the ability to notify a store manager or other store personnel through any communication means known in the art that a specific consumer has activated the dispenser 10. An example of this is if a manager wants to know when a high spending consumer is in his store, he/she can define in the system a notification option which activates when the consumer activates the dispenser.

Figure 4A:
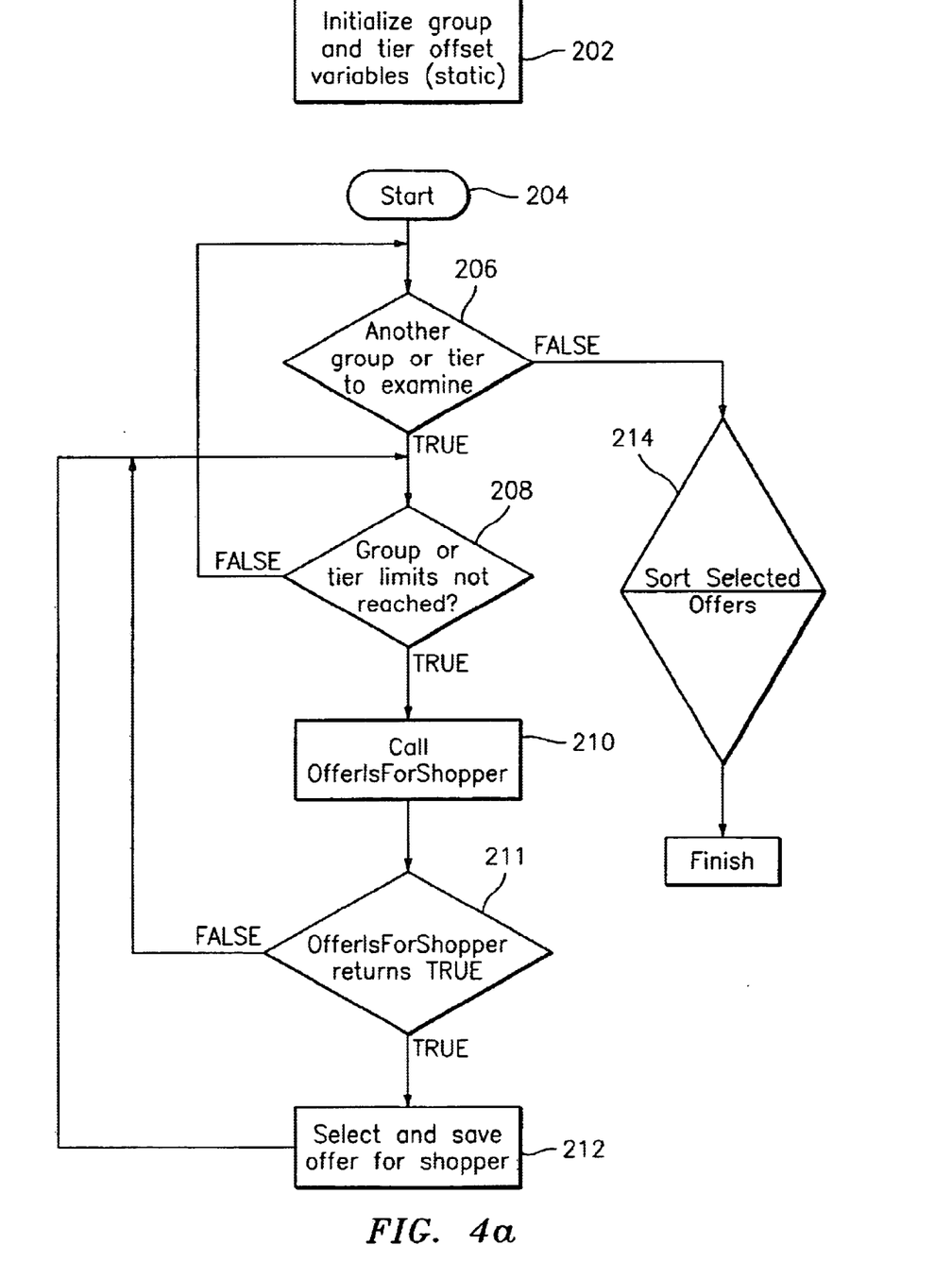
FIGS. 4a–4c are flow charts showing how the method of the present invention is implemented.
Figure 4B:
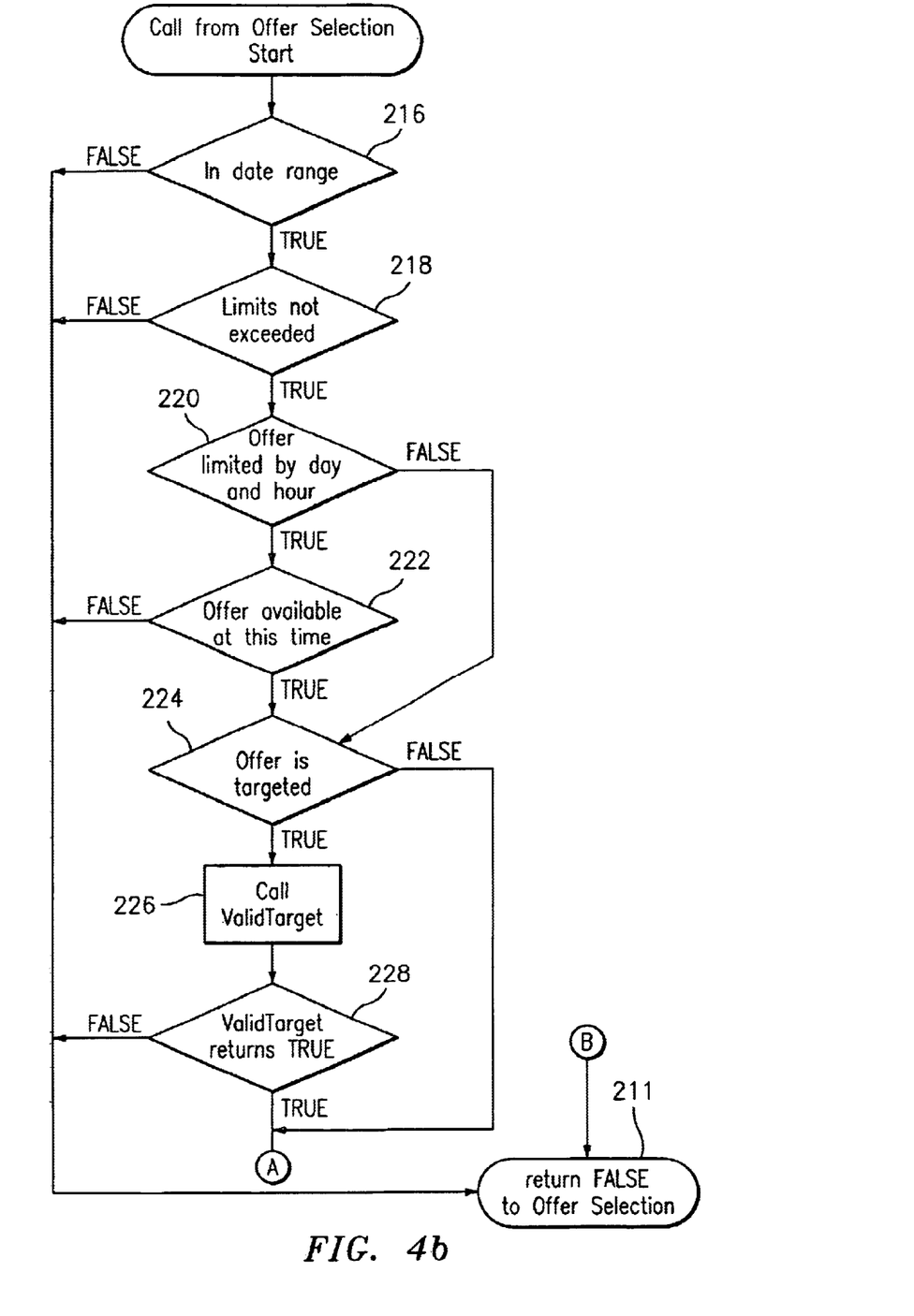
Figure 4C:
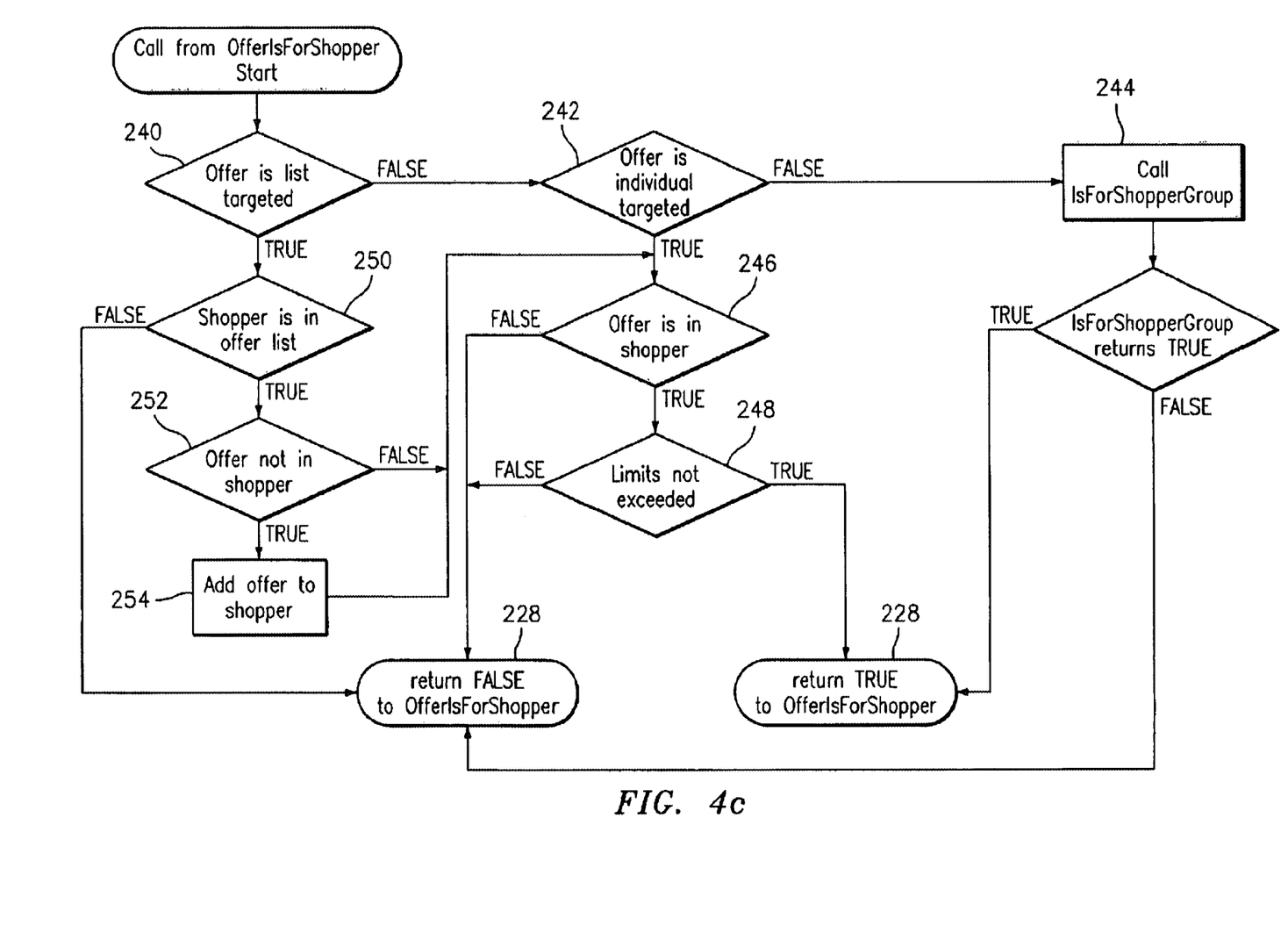

The manner in which the programming implementing the method of the present invention operates is shown in the flow charts of FIGS. 4a–4c. As shown in FIG. 4a, in step 202, the group and tier offset variables are initialized. At step 204, the consumer or shopper has activated the dispenser 10 and the offer selection process commences by examining a first one of the groups in step 206 starting with the highest priority tier in the group and descending through the ranked tiers. In step 208, the program determines whether any group or tier limits have not been reached. If the group or tier limits have been reached, the program returns to step 206 to begin the examination of the next group. If the group or tier limits have not been reached, the program moves onto step 210 where it is determined if the offer is for the shopper. This step will be discussed in more detail in connection with FIG. 4b. If the result of step 210 is that the offer is available for the shopper, then the program moves onto step 212 where the offer is selected and saved. If the offer is not available for the shopper, the program returns to step 208. When all the groups and tiers have been examined, the selected offers are sent to step 214 where they are sorted. The sorted, selected offers are then sent to the printer 12 for printing of the offer sheet 11.

FIG. 4b shows the process which occurs during step 210. As shown in this figure, the program first determines in step 216, whether the offer is within the date range for it. If the answer is false, a false indication is returned to step 211. If the answer is true, the program proceeds to step 218 where the offer limits are checked. If the limit for this offer is exceeded, a false indication is returned to step 211. If the limit offer is not exceeded, then the program proceeds onto step 220. In step 220, the program checks to see whether the offer is limited by day and hour. If the offer is not limited by day and hour, the program proceeds to step 224. If it is limited by day and hour, the program proceeds to step 222. In step 222, the offer is checked to determine if it is available at this time. If the answer is that the offer is not available at this time, a false signal is sent to step 211. If the offer is available, then the program proceeds to step 224. In step 224, the program determines whether the offer is targeted or not. If the offer is not targeted, a false indication is sent to step 227. If the offer is targeted, then the program proceeds to step 226 to determine whether this is a valid target offer. The operation of the program in step 226 will be discussed in connection with FIG. 4c hereinafter. If the targeted offer is false, then a false signal is sent to step 211. If targeted offer is true, then the program proceeds to step 227 where it is determined if the offer contains issue or redemption limits. If the offer does not contain any issue or redemption limits, the program proceeds to step 230. If the offer does contain issue or redemption limits, the program then proceeds to step 229. In step 229, the program determines whether the offer is stored in the shopper record. If the offer is stored in the shopper record, the program proceeds to step 230. If the offer is not stored in the shopper record, then the program stores the offer in the shopper record in step 231. After storing the offer in the shopper record, the program then proceeds to step 230. In step 230, it is determined whether the shopper has received the offer on the basis of a modulo count. If the offer has not been received on the basis of a modulo count, a false signal is sent to step 233. If the signal from step 230 is true, the program proceeds to step 232 where it matches the activation number assigned to the shopper with a predetermined modulo count. If the modulo count is matched, the program proceeds to step 233. If the modulo count is not matched, then a false signal is sent to step 211.

In step 233, the program once again determines if the offer is in the shopper record. If the offer is not in the shopper record, the program proceeds to step 211 which returns a true signal. If the offer is in the shopper record, the program proceeds to step 234. In step 234, the offer is checked to see whether there is a limit on the number of times that the offer can be issued or redeemed. If the answer in step 234 is false, then the program proceeds on to step 211 where a true signal is issued. If there is a limit on the number of times that the offer can be issued or redeemed, the program proceeds to step 235. In step 235, the program determines whether the issue or redeem count is zero (no offer to be issued if count is zero). If the answer to step 235 is false, then the program proceeds to step 211 where a true signal is issued. If the answer to step 235 is true, then the program proceeds to step 211 where a false signal is issued.

Moving now to FIG. 4c, in step 240, the offer is checked to see if it is list targeted. If the offer is not list targeted, the program proceeds to step 242 where it is determined whether the offer is individual targeted. If it is determined that the offer is not individual targeted, then the program proceeds to step 244 to determine whether the shopper falls within a group that is to receive the offer or whether the shopper is ineligible for any reason. If it is determined, that the shopper falls within a group entitled to receive the offer, then a true signal is returned to step 228. If it is determined that the shopper does not fall within a group entitled to receive the offer or is otherwise ineligible, then a false signal is returned to step 228.

Returning now to step 242, if it determined that the offer is to a targeted individual, the program determines in step 246, whether the offer is already in the list of those selected for this shopper. If the answer is true, then the program proceeds to step 248 where it is checked to see if any limits have been exceeded. If the limits have not been exceeded, then a true signal is sent to step 228. If the limits have been exceeded then a false signal is sent to step 228.

Returning now to step 240, if the offer is list targeted, the program proceeds to step 250 where it is determined if the shopper is on the offer list. If the answer is false, then a false signal is sent to step 228. If the answer is true, the program proceeds onto step 252 where it is determined whether the offer is not in the selected offers for this shopper. If the answer is true, then the offer is added to those selected for the shopper in step 254 and the program proceeds to step 246. If the answer is false, then the program proceeds to step 246.

In a preferred implementation of the method of the present invention, when the tiers in each group are examined during the selection process, the system of the present invention will mark the place where the selection process within a tier of a group ended. Consequently, if the selection process for a particular tier examined all offers within a tier, the tier would be so marked. If the selection process for a particular tier did not examine all offers within a tier, this would be marked as well so that when the next selection process begins, it begins at the marked location.

One of the principal advantages to the store level marketing system and method of the present invention is that a sheet of paper containing a number of offers can be printed and presented to a consumer within seconds after initiation of the dispensing process. Yet another advantage of the store level marketing system and method of the present invention is that the document containing the offers can be customized for each customer.

It is apparent that there has been provided in accordance with this invention a method for dispensing offers to consumers which fully satisfies the objects, means, and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A method for selecting offers to be provided to a consumer, said method comprising the steps of:

providing a database containing a plurality of available offers with said offers being arranged in groups and said offers in each of said groups being arranged in ranked tiers;

connecting a consumer activated dispenser to said database;

selecting a plurality of offers from said database for presentation to said consumer each time said consumer activates said dispenser; and said selecting step comprising examining each group in said database for available offers starting with a highest priority tier in said group and proceeding to a lowest priority tier.

2. The method according to claim 1, wherein said group examining step comprises examining each tier in said group until all offers in said tier have been examined or enough offers have been found to satisfy a maximum offer per tier requirement.

3. The method according to claim 2, wherein said tiers within each group are examined on a priority descending basis.

4. The method according to claim 1, further comprising verifying that said consumer is eligible for said selected offers.

5. The method according to claim 4, wherein said verifying step comprises verifying that each said offer is within a valid time limit.

6. The method according to claim 5, wherein said time limit is set by an operator of said database.

7. The method according to claim 4, wherein said verifying step comprises verifying that each said offer does not exceed a counting limit.

8. The method according to claim 1, further comprising selecting from said database at least one offer targeted for said consumer.

9. The method according to claim 8, wherein said at least one targeted offer is selected by comparing an identification number assigned to offers within said database with an identification number assigned to said consumer.

10. The method according to claim 8, wherein said targeted offers are compared to issue and redemption limits for said consumer within said database to determine whether said consumer has exceeded said issue and redemption limits.

11. The method according to claim 1, further comprising selecting at least one offer from said database based upon a specific group of characteristics possessed by said consumer.

12. The method according to claim 1, further comprising selecting offers from said database based upon a specific group of categories to which said consumer belongs.

13. The method according to claim 1, further comprising selecting at least one offer from said database if said consumer activating said dispenser meets count criteria.

14. The method according to claim 1, further comprising cross checking offer details with an internal point of sale system within a store prior to selecting said offer for presentation to said consumer.

15. The method according to claim 14, wherein said cross checking step comprises comparing a value of an offer with a valid offer value stored in said internal point of sale system.

16. The method according to claim 15, further comprising adjusting the offer value if said offer value differs with said offer value stored in said internal point of sale system.

17. The method according to claim 1, further comprising said a user modifying the value of at least one selected offer.

18. The method according to claim 1, further comprising updating said database each time said consumer redeems an offer.

19. The method according to claim 18, further comprising updating a database associated with each dispenser in a retail store each time said consumer activates a dispenser and receives a set of offers.

20. The method for providing a consumer with a plurality of offers to be used to purchase goods, said method comprising the steps of:

providing a database containing a plurality of available offers with said offers being arranged in groups and said offers in each of said groups being arranged in ranked tiers;

connecting a consumer activated dispenser to said database;

selecting a plurality of offers from said database for presentation to said consumer each time said consumer activates said dispenser;

said selecting step comprising examining each group in said database for available offers starting with a highest priority tier in said group and proceeding to a lowest priority tier; and dispensing a printed sheet containing said selected offers at said dispenser.

21. The method according to claim 20, further comprising notifying store personnel when said consumer activates said dispenser.

* * * * *